United States Patent
Kraus

(10) Patent No.: US 6,398,473 B1
(45) Date of Patent: Jun. 4, 2002

(54) PLASTIC CONNECTOR WITH RADIALLY EXTENDING RIBS AND A REDUCED DIAMETER PORTION

(75) Inventor: Willibald Kraus, Grünstadt (DE)

(73) Assignee: TRW Automotive Electronics & Components GmbH & Co. KG (DE)

( * ) Notice: Subject to any disclaimer, the term of this patent is extended or adjusted under 35 U.S.C. 154(b) by 0 days.

(21) Appl. No.: 09/573,280

(22) Filed: May 18, 2000

(30) Foreign Application Priority Data

May 18, 1999 (DE) ..................................... 299 08 703 U

(51) Int. Cl.[7] ................................................. F16B 19/00
(52) U.S. Cl. ............................ 411/508; 411/48; 411/49
(58) Field of Search ................................. 411/508, 908, 411/913, 452, 487, 493, 498, 499, 49, 48, 44

(56) References Cited

U.S. PATENT DOCUMENTS 4,832,547 A * 5/1989 Shiraishi
4,840,523 A * 6/1989 Oshida
4,940,355 A * 7/1990 Buchanan
5,370,484 A * 12/1994 Morikawa

* cited by examiner

Primary Examiner—Flemming Saether
(74) Attorney, Agent, or Firm—Fay, Sharpe, Fagan, Minnich & McKee, LLP

(57) ABSTRACT

A plastic connector 1 is provided for connecting an associated support member with an associated plate element. A generally cylindrical elongate neck shaped intermediate zone 5 defines a longitudinal axis and carries on a first end an upper part 2 and on a second end a lower part 3. The upper part is selectively attachable to the associated plate element. The lower part 3 is selectively connectable with the associated support member and includes a cover cone portion 22 defining a generally pointed conical tip S. A plurality of ribs 15, 15' are arranged longitudinally on the lower part and extend radially outwardly from the lower part by a first height H, the first height being greater than an outer diameter D formed by the intermediate zone 5. A spherical constriction portion 20 is defined between the intermediate zone 5 and the cover cone portion 22 to enable secure connection between the associated support member and plate element and to assist in installation of the connector.

22 Claims, 2 Drawing Sheets

PLASTIC CONNECTOR WITH RADIALLY EXTENDING RIBS AND A REDUCED DIAMETER PORTION

BACKGROUND OF THE INVENTION

The subject invention is directed to the connector art and, more particularly, to a plastic connection element with an upper part selectively attachable to an associated plate element, a lower part carrying radially extending ribs and forming a cover cone portion selectively connectable to an associated support element, and a substantially cylindrical intermediate zone disposed between the upper and lower parts and provided with a plurality of radially extending locking elements.

Connectors of the type under consideration are commonly used in the motor vehicle art to connect motor vehicle body parts to associated trim components such as, for example, door or wall paneling. One such connection element is described in German utility model 298 10 347.7. As taught there, an engagement component is provided for selective embedded connection into a support opening. An intermediate zone of the connection element penetrates into the support opening. A sleeve element surrounds an upper part of the intermediate zone. The sleeve element is selectively lockable with locking elements provided on the connection element and with engagement components. A sealing element is selectively provided between the sleeve element and the engagement component. The sealing element acts upon the top surface of the support.

The use of separate sleeve elements and/or sealing elements between the support member and plate element has caused assembly problems. Also positive connection between the associated connection and support elements is not always obtained.

SUMMARY OF THE INVENTION

The subject invention provides a plastic connector that overcomes the above noted problems and results in a unitary type plastic connector that is easy to use and, additionally, provides improved holding between support elements and plate elements to be connected.

In particular, and in accordance with one aspect of the invention, there is provided a plastic connector for connecting an associated support member with an associated plate element. An elongate neck shaped intermediate zone portion of the plastic connector has a first diameter and generally defines a longitudinal axis of the plastic connector. An upper part of the connector is formed on a first end of the intermediate zone and is adapted to selectively attach to the associated plate element. A lower part is formed on the second end of the intermediate zone and includes a cover cone portion selectively connectable with the associated support member. A plurality of locking elements are carried on the neck shaped intermediate zone and a plurality of ribs are arranged longitudinally on the lower part. Preferably, the ribs extend radially outwardly from the lower part by a first height greater than the first outer diameter of the intermediate zone. A reduced diameter spherical constriction portion is defined between the intermediate zone and the cover cone portion.

In accordance with a more limited aspect of the invention, at least two of the plurality of ribs are disposed diagonally opposite each other on the lower part.

As a result of the longitudinal ribs projecting radially outwardly well beyond the diameter of the intermediate zone, the holding effect of the subject plastic connector is vastly improved. Additionally, due to the spherical constriction region, the installation of the subject plastic connector is also greatly enhanced.

In accordance with a further aspect of the invention, several longitudinal ribs are selectively arranged diagonally opposite each other on the lower part. In one form, a total of four longitudinal ribs are provided.

In accordance with a further limited aspect of the invention, the plurality of ribs can have identical or different lengths, as well as identical or different heights.

According to yet another more limited aspect of the invention, the plurality of ribs project longitudinally along the lower part and extend in a curved fashion along the cover cone portion to its tip or terminus.

In accordance with yet a further aspect of the invention, the lengths of the intermediate zone and lower part of the subject connector are substantially of equal lengths.

As can be seen from the foregoing, a primary object of the invention is the provision of a plastic connector that is easy to install and provides improved holding capability.

The above and other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, the preferred embodiments of which will be described in detail in this specification and illustrated in the accompanying drawings which form a part hereof, and wherein.

DETAILED DESCRIPTION OF THE PREFERRED EMBODIMENTS

Figure 1:
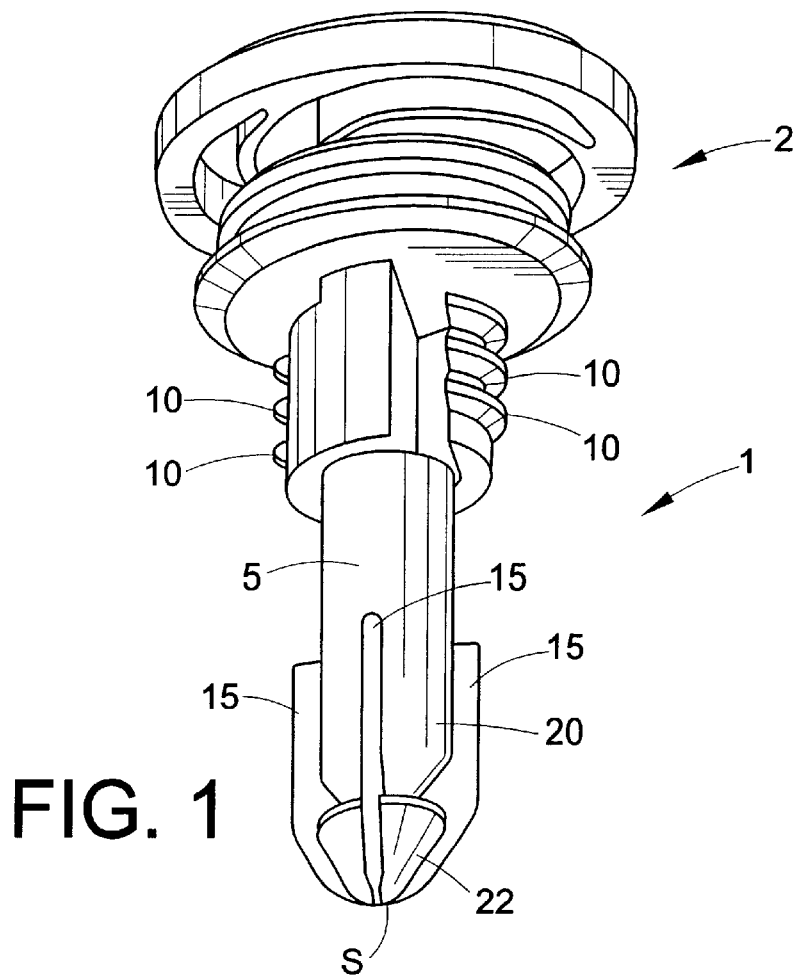
FIG. 1 is an isometric bottom view showing the overall arrangement of the subject connection element formed in accordance with the first preferred embodiment of the invention.
Figure 2:
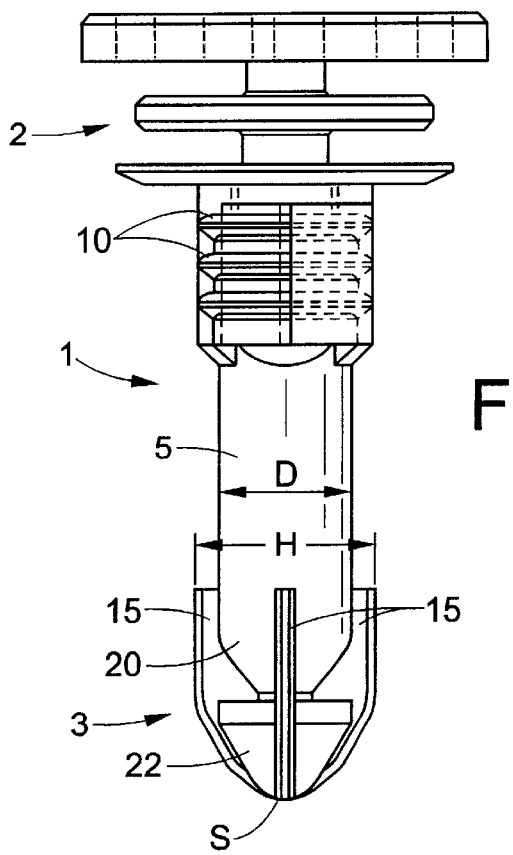
FIG. 2 is a side elevational view of the connection element shown in FIG. 1.

Referring now to the drawings wherein the showings are for the purposes of illustrating the preferred embodiments of the invention only and not for purposes of limiting same, the overall arrangement of the subject plastic connection element is shown with reference first to FIGS. 1 and 2. As illustrated, the connection element 1 includes an upper part 2, a lower part 3 with a cover cone portion 22, and an intermediate one 5 disposed between the upper part 2 and the lower part 3. Preferably, a s illustrated, the intermediate zone 5 is substantially cylindrical and formed to have a neck shape. Further, as illustrated, the intermediate zone is provided with a plurality of locking elements 10.

With continued reference to FIGS. 1 and 2, the upper part 2 of the connection element 1 is selectively attachable to an associated plate element (not shown) which in practical use of the subject invention can be a door or a wall paneling component piece of an associated motor vehicle.

The lower part 3 of the subject plastic connector 1 is selectively attachable to an associated support member (not shown) such as, for example, a motor vehicle body. The motor vehicle body may optionally be provided with a sleeve element, a sealing element, and/or an engagement part.

In accordance with the present invention, the lower part 3 is provided with a plurality of outwardly extending longitudinal ribs 15. As shown, the height H of the ribs is greater than the diameter D defined by the intermediate zone 5. Moreover, as can be seen with reference to FIGS. 1 and 2, a spherical constriction or reduced region 20 is provided adjacent the intermediate zone and the plurality of longitudinal ribs. These constructions provide improved holding characteristics in the subject connector and assist in connecting the lower part with the associated support element.

Preferably, four longitudinal ribs 15 are provided and are positioned in pairs diagonally opposite each other and respectively have the same length. Preferably, the longitudinal ribs 15 project above a cover cone portion 22 of the subject plastic connector and extend to its tip or terminus in a curved fashion as shown. Based on the specific preferred shape of the longitudinal ribs, improved retention of the subject plastic connector is attained. The spherical constriction 20 or reduced diameter region leading to the cover cone portion 22 assures easier installation of the subject connector as well.

Figure 4:
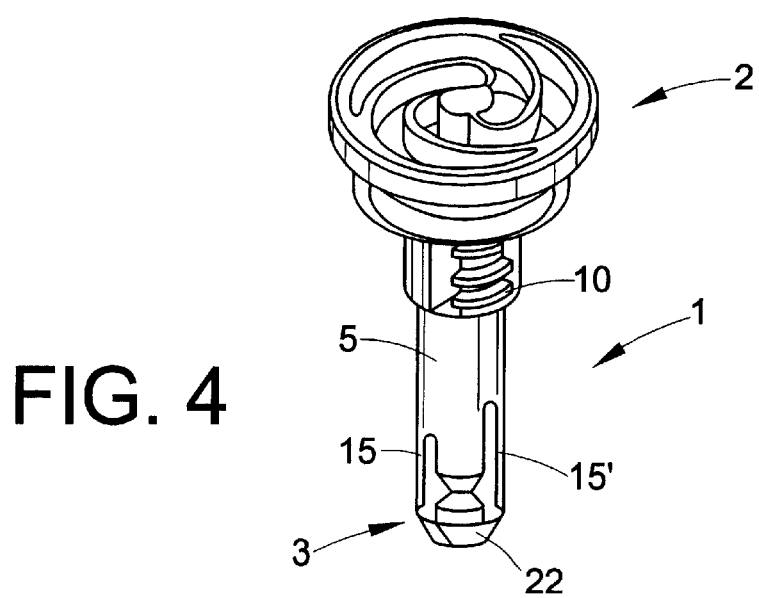
Figure 3:
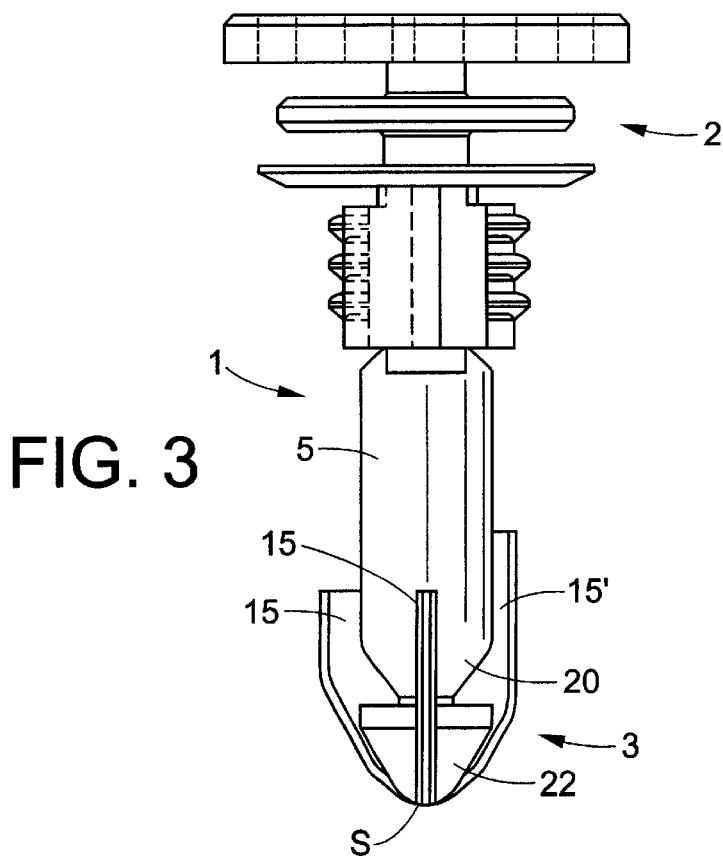
FIG. 3 is a front elevational view showing the overall arrangement of the subject connection element formed in accordance with the second preferred embodiment of the invention; and, FIG. 4 is a top isometric view showing the overall arrangement of the plastic connection element formed i n accordance with the second preferred embodiment of the invention shown in FIG. 3.

In accordance with a second preferred embodiment of the invention and with reference now to FIGS. 3 and 4, the plurality of longitudinal ribs 15' are provided having different lengths. In accordance with this embodiment, a first longitudinal rib 15 is disposed diagonally opposite a dimensionally longer longitudinal rib 15'. In yet another alternative embodiment, two longitudinal ribs 15' face each other diagonally while the neighboring longitudinal ribs 15' having smaller length face each other diagonally as well.

It is to be appreciated that both the shorter longitudinal ribs 15 as well as the longer longitudinal ribs 15' may have identical or different heights H.

It is to be further appreciated that, preferably, the intermediate zone 5 and the lower part 3 have approximately equal lengths.

As a result of the general form of the connection element 1 illustrated in the figures, an overall improvement both with respect to installation as well as holding ability is provided by the subject invention over the prior art connectors discussed above.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

What is claim is:

1. A connector for connecting an associated support member with an associated plate element, the unitary connector comprising:
   an elongate neck shaped intermediate zone generally defining a longitudinal axis of the connector, the intermediate zone defining a first diameter;
   an upper part on a first end of the intermediate zone and adapted to connect with the associated plate element;
   a lower part on a second end of the intermediate zone and including a cover cone portion adapted to connect with the associated support member;
   a plurality of locking elements carried on the intermediate zone;
   a plurality of ribs arranged longitudinally on the lower part, the ribs having approximately equal lengths along said longitudinal axis and extending radially outwardly from the lower part by a first height greater than said first diameter of the intermediate zone and by unequal heights in a direction transverse said longitudinal axis; and,
   a spherical constriction portion defined between the intermediate zone and the cover cone portion.

2. A connector for connecting an associated support member with an associated plate element comprising:
   an elongate neck shaped intermediate zone having a first diameter and generally defining a longitudinal axis of the connector;
   an upper part on a first end of the intermediate zone and adapted to connect with the associated plate element;
   a lower part on a second end of the intermediate zone and including a cover cone portion adapted to connect with the associated support member;
   a plurality of locking elements carried on the intermediate zone; and,
   a plurality of ribs arranged longitudinally on the lower part, the ribs extending radially outwardly from the lower part by a first height greater than said first diameter of the intermediate zone wherein at least two of the plurality of ribs have unequal lengths along said longitudinal axis.

3. The plastic connector according to claim 2 wherein the plurality of ribs extend radially outwardly from the lower part by approximately equal heights.

4. The plastic connector according to claim 2 wherein at least a pair of the plurality of ribs extend radially outwardly from the lower part by unequal heights.

5. The plastic connector according to claim 4 wherein:
   said cover cone portion defines a generally pointed tip portion on an end of the lower part; and,
   said plurality of ribs are formed longitudinally along the lower part and extend along a curved path towards the tip portion of the cover cone portion.

6. The plastic connector according to claim 5 wherein the intermediate zone and the lower part have approximately equal lengths in a direction of said longitudinal axis.

7. A plastic connector comprising:
   an elongate intermediate zone generally defining a longitudinal axis of the plastic connector, the intermediate zone defining a first diameter;
   an upper part formed by a first end of the intermediate zone and being adapted to connect with all associated plate element;
   a lower part formed by a second end of the intermediate zone and being adapted to connect with an associated support member, the lower part including a cone shaped guide tip portion;
   a plurality of ribs arranged longitudinally on the lower part, at least two of the plurality of ribs extending radially outwardly from the lower part by unequal heights in directions transverse said longitudinal axis; and,
   a reduced diameter portion defined between the intermediate zone and the guide tip portion.

8. The plastic connector according to claim 7. wherein at least two of said plurality or ribs are disposed on opposite sides of the lower part.

9. The plastic connector according to claim 8 wherein said plurality of ribs are formed longitudinally along the lower part and extend along a curved path towards the guide tip portion.

10. The plastic connector according to claim 7 wherein the plurality of ribs have approximately equal lengths along said longitudinal axis.

11. A connector for connecting an associated support member with an associated plate element, the connector comprising:
    an elongate intermediate zone generally defining a longitudinal axis of the connector, the intermediate zone defining a first diameter;
    an upper part on a first end of the intermediate zone and adapted to connect with the associated plate element;
    a lower part on a second end of the intermediate zone and including a cover cone portion adapted to connect with the associated support member;
    a plurality of locking elements carried on the intermediate zone; and,
    a plurality of ribs arranged longitudinally on the lower part, the ribs extending radially outwardly from the lower part by a first height greater than said first diameter of the intermediate zone, at least two of the plurality of ribs extending radially outwardly from the lower part by unequal heights in a direction transverse said longitudinal axis.

12. The connector according to claim 11 wherein at least one pair of said plurality of ribs is disposed diagonally opposite each other on said lower part.

13. The connector according to claim 11 wherein:
    said cover cone portion defines a generally pointed tip portion on an end of the lower part; and,
    said plurality of ribs are formed longitudinally along the lower part and extend along a curved path towards the tip portion of the cover cone portion.

14. The connector according to claim wherein said plurality of ribs includes at least four ribs.

15. The connector according to claim 11 wherein the intermediate zone and the lower part have approximately equal lengths along a direction of said longitudinal axis.

16. The connector according to claim 11 wherein the plurality of ribs have approximately equal lengths along said longitudinal axis.

17. The connector according to claim 11 wherein at least two of the plurality of ribs have unequal lengths along said longitudinal axis.

18. A connector for connecting an associated support member with an associated plate element, the connector comprising:
    an elongate intermediate zone generally defining a longitudinal axis of the connector, the intermediate zone defining a first diameter;
    an upper part on a first end of the intermediate zone and adapted to connect with the associated plate element;
    a lower part on a second end of the intermediate zone and including a cover cone portion adapted to connect with the associated support member;
    a plurality of locking elements carried on the intermediate zone; and,
    a plurality of ribs arranged longitudinally on the lower part, the ribs extending radially outwardly from the lower part by a first height greater than said first diameter of the intermediate zone, at least two of the plurality of ribs having unequal lengths along said longitudinal axis.

19. The connector according to claim 18 wherein the plurality of ribs extend radially outwardly from the lower part by approximately equal heights.

20. The connector according to claim 18 wherein at least a pair of the plurality of ribs extend radially outwardly from the lower part by unequal heights.

21. The connector according to claim 20 wherein:
    said cover cone portion defines a generally pointed tip portion on an end of the lower part; and,
    said plurality of ribs are formed longitudinally along the lower part and extend along a curved path towards the tip portion of the cover cone portion.

22. The connector according to claim 21 wherein the intermediate zone and the lower part have approximately equal lengths along a direction of said longitudinal axis.

* * * * *